April 5, 1966 C. V. PENNELL ETAL 3,244,918
CORE CONSTRUCTION AND METHOD OF INSULATING THE WINDINGS THEREOF
Filed Feb. 1, 1960
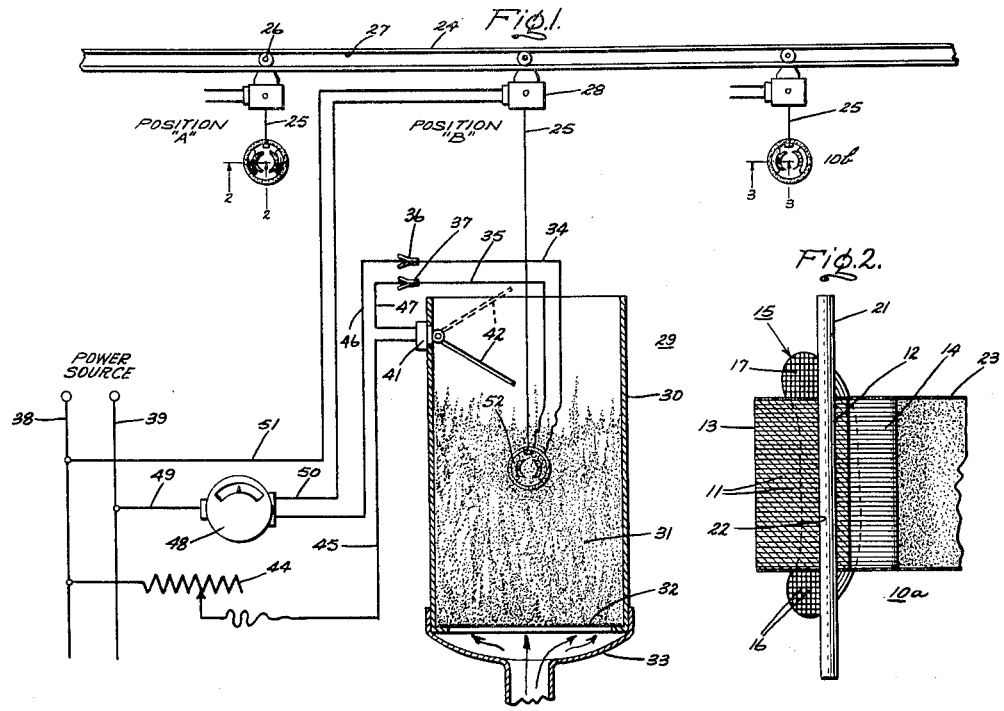
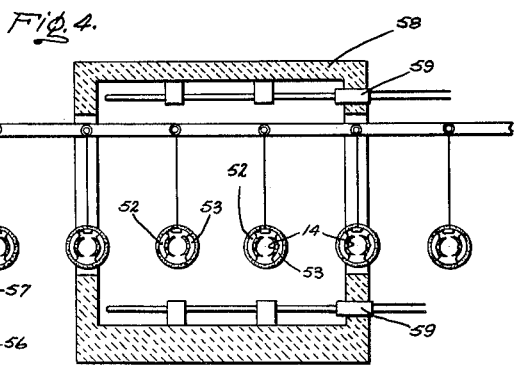
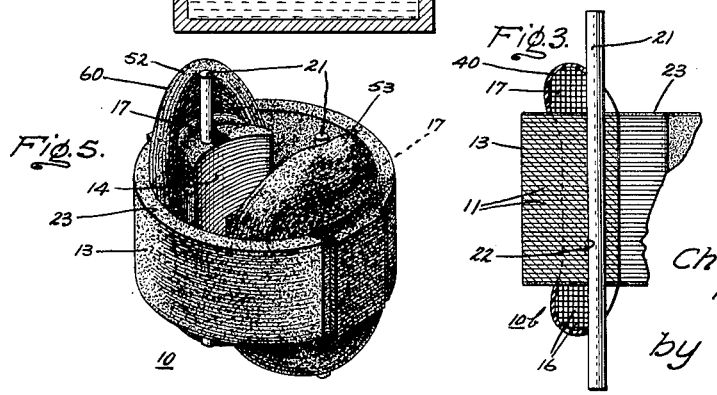
Inventors:
Charles V. Pennell,
Henry E. Vance,
by John M. Stoudt
Attorney.

United States Patent Office 3,244,918
Patented Apr. 5, 1966

3,244,918
CORE CONSTRUCTION AND METHOD OF INSULATING THE WINDINGS THEREOF
Charles V. Pennell and Henry E. Vance, Fort Wayne, Ind., assignors, by mesne assignments, to Polymer Processes, Inc., a corporation of Pennsylvania
Filed Feb. 1, 1960, Ser. No. 5,677
2 Claims. (Cl. 310—184)

This invention relates to dynamoelectric machines, and more particularly, to an improved magnetic core construction and to a process for insulating the windings thereof.

In the conventional dynamoelectric machine construction, especially in small or fractional horsepower induction electric motors, the stator core member is provided with a rotor receiving bore and winding slots or accommodating means extending radially outward from the bore. A predetermined number of coils of copper wire, usually coated with insulation such as enamel, form windings which are arranged within the winding accommodating means and have end turns located axially beyond the end faces of the stator core member. This construction introduces certain considerations, which must be taken into account and provided for, in the satisfactory mass production of motors. For example, it is important that the winding end turns be secured into a relatively stationary and compact bundle, away from the stator bore, so that the end turns will not interfere with the relative rotation between the stator core and the rotor during motor operation. Moreover, it is necessary to prevent damage to the winding end turns resulting from movement of the individual wires against each other caused by vibrations, tending to rub off the enameled insulation and baring the wires.

Motors having the aforementioned stator core structure, in many situations, employ a main or excitation winding and an auxiliary winding arranged on the core in close proximity to one another. This introduces other considerations, adding to the complexity and over-all cost of producing motors. For instance, due to the usual difference in voltage potential between the main and auxiliary windings, the operation of the motor would be adversely affected were the windings allowed to contact each other.

For these and other reasons, it has become common practice to interpose a separate electrical insulating sheet member (phase insulators) between adjacent coils of the different windings, both in the core slots and at the end turns. However, these insulating members, normally constructed in a single piece from a sheet of Mylar material, have been in themselves relatively expensive and their installation, requiring costly inserting apparatus and labor, has added appreciably to the over-all production costs.

In certain motor designs utilizing the main and auxiliary winding arrangement; e.g. a motor for aircraft applications, heat generated in the stator core or by the current passing through the main winding must be satisfactorily dissipated. Without adequate dissipation, the heat will have the general effect of increasing the resistance of the main winding and the total temperature rise of the motor, thereby producing a marked decrease in motor efficiency and performance. It is thus important in this type of situation that the insulation between the main and auxiliary winding does not interfere with effective heat dissipation from the main winding.

For these reasons, it is desirable that an inexpensive yet highly effective electrical insulation means be provided for insulating adjacent windings from each other. Further, it is particularly desirable that the insulation be applied by a practical and economical manufacturing process which eliminates the need of costly apparatus and labor heretofore required with the use of fabricated insulators.

Accordingly, it is a primary object of the invention to provide an improved core construction in which the individual wires of the winding coils are maintained stationary relative to one another, the coil end turns are retained away from the bore, and adjacent coils are electrically insulated one from the other by an economical and practical process capable of mass production use.

Another object of this invention is the provision of an improved core structure having main and auxiliary windings electrically insulated, one from the other, the insulation not materially affecting the dissipation of heat from the main winding under operating conditions.

A further object of this invention is to provide an improved and simple method of insulating coils of a magnetic core member, the method involving a minimum of manufacturing expense.

A further object of this invention is to provide an improved method for applying a coating of insulation on the surface of at least one of a pair of adjacent coils.

Yet another object of the present invention is to provide an improved and relatively inexpensive method of applying insulation between a main and auxiliary winding without materially affecting the dissipation of heat from the main winding during motor operation.

In carrying out the objects in one form thereof, we provide an improved method of manufacturing a stator from a core member having a bore and winding accommodating means disposed adjacent the bore. In this method, we initially arrange the core with an auxiliary winding in the winding accommodating means. The core and winding are then immersed into a fluidized bed of powdered electrical insulating material and the winding is simultaneously energized to heat the wires above the melting point of the material but below the deleterious temperature of the wire. After a predetermined period of time, the core is removed from the fluidized bed and the winding is deenergized. The winding is then cooled to produce a hardened uniform layer of insulation on the surface thereof. A main winding is positioned adjacent the auxiliary winding in the winding accommodating means and a coating of bonding material is applied to the main winding to bond the wires together in a stationary mass.

By a further aspect of the present invention, in one form thereof, the stator produced by the above described novel manufacturing procedure, has its main and auxiliary windings electrically insulated, one from the other without the use of fabricated insulating material and, at the same time, has each of its windings formed into a stationary mass.

The subject matter which we regard as our invention is particularly pointed out and distinctly claimed in the concluding portion of this specification. Our invention, itself, however, both as to the organization and operation, together with further objects and advantages thereof, may best be understood by reference to the following description taken in connection with the accompanying drawing.

In the drawing:

FIG. 1 is a schematic side elevational view, partially in cross section, of the preferred way of applying the electrical insulation to one of the windings of the stator core member of a dynamoelectric machine;

FIG. 2 is an enlarged axial view, partially in section, of a portion of the stator core prior to the application of the insulation to the winding, the view being taken along line 2—2 in FIG. 1;

FIG. 3 is an enlarged axial view, partially in section, of a portion of the stator core after the application of electrical insulation to the winding, the view being taken along line 3—3 in FIG. 1;

FIG. 4 is a schematic view, partially in section, of the step of coating and bonding the main winding and stator core; and FIG. 5 is a view in perspective of the preferred embodiment of the improved stator core of the present invention.

Referring now to the drawing in more detail, the various figures show our invention as applied to the manufacture of a two-pole stator 10 of the type suitable for use in a fractional horsepower alternating current induction motor (not shown).

Prior to its manufacture in accordance with the preferred process of the present invention, the stator may be provided in the form shown in part by FIG. 2 and identified generally at 10a. The illustrated stator 10a at this stage of assembly, comprises a plurality of identical sheet-like laminations 11, secured together in superposed face to face relation to provide an aligned core or stack of the salient pole type. More specifically, the illustrated stack has two poles 12 (only one being shown in FIG. 2) disposed inwardly of a yoke section 13. The inner edges of the poles form between them a rotor receiving bore 14 in the usual way.

An auxiliary winding 15, wound with a predetermined number of turns of suitable wire 16 such as enameled magnet copper wire to form a pair of coils 17, has one coil distributed around the neck of each pole. Each coil, in turn, has end turns 18 extending axially beyond the respective side faces 19 and 20 of the laminated stack. A winding pin 21 is tightly fitted into winding pin accommodating passage 22 which extends axially through each pole, between the coil 17 and bore 14. The pins serve to hold the lamination 12 in an assembled relations as well as to retain the coil end turns 18 away from the bore 14. The coils 17 are electrically insulated from the stack in any suitable manner, as by a hardened coating of thermoplastic material 23 provided around the neck of poles 12. The pin and coil stack insulation arrangement of the type set forth above, forms no part of the present invention and is disclosed and claimed in the co-pending U.S. patent application Serial No. 799,150, now Patent Number 3,030,528, filed March 13, 1959 by Milton V. DeJean and assigned to the same assignee as the instant invention.

The preferred manner in which stator 10a is finished and the resulting construction are illustrated by FIGS. 1 and 3–5 inclusive. Referring specifically to FIG. 1, there is shown an arrangement for applying electrical insulation to the auxiliary winding 15. Any suitable means for transporting the objects to be insulated (auxiliary winding 15), such as a conveyor 24, may be provided, together with a number of supports, generally identified by numeral 25, secured to move along the conveyor in any well known way, as by roller 26 moving within track 27. Support 25 may include any means, for example, a motor and winch assembly shown at 28, for lowering and raising the objects to be insulated into and out of a "fluidized" bed, denoted by numeral 29. A "fluidized" bed is, as is well known in the art, a mass of solid particles which as the liquid-like characteristics of hydrostatic pressure and mobility, among others.

The "fluidized" bed system used in the present process is of standard construction and, as shown, includes a tank 30 in which there is contained a mass of powdered insulating material 31 which may be, for instance, an epoxy resin. The bottom of the tank consists of a perforated screen base 32 and supply pipe 33 through which a supply of gas or air may be forced under pressure (in the directions of the arrows) into the powdered material in the manner to be described hereinafter.

Stator 10a is initially placed or hung onto support 25, shown in position "A" of FIG. 1, and moved by conveyor 24 to a point directly above tank 30. The external leads 34 and 35 of auxiliary winding 15 are then connected, as by quick-connect clip means 36 and 37, to a suitable source of power; e.g. direct current supply lines 38 and 39. Stator 10a is then lowered into the bed of fluidized material 31, the material being agitated and suspended by the upward stream of gas being blown therethrough by any suitable fan means (not shown).

While the stator is being immersed into the fluidized material 31 (position "B" in FIG. 1), the auxiliary winding 15 is simultaneously energized. Due to the resistance of the wires making up coils 17, the winding becomes heated and is maintained above the meling point of the material for a predetermined period of time. By "melting point" as used herein is meant that stage at which the powdered material is sufficiently "tacky" to adhere to the exposed heated surface of the winding 15. The powdered material 31, which is kept in motion in tank 30 by the stream of gas, will flow against the exposed wires of winding 15, both at the end turns 18 and adjacent the neck of poles 12. The powder coming into contact with these heated wires, due to the transfer of heat, will coalesce into a continuous coating covering the outer winding surface. Since the stator core remains below the melting point of the insulation material 31 throughout the immersion step, not insulation will adhere to it. This is an important feature of the present invention, for only the desired surface of winding 15 will be insulated and there is no need for masking the core or any other part of the stator not intended to be coated. Further, it will be apparent to those skilled in the art that, although we have shown the winding being energized while the core is being lowered into the fluidized bed, the present invention contemplates the energization of the winding at any time prior to, during, or after the core has been placed in the fluidized bed.

After a predetermined period of immersion, the winding is deenergized and removed from the tank and the coils and coating allowed to cool in order that the insulating material may be cured into a hard uniform layer of electrical insulation, identified in FIG. 3 by the numeral 40. It will be appreciated that the thickness of the insulating coating is dependent upon the temperature to which the winding is heated and the total duration of immersion thereof in the fluidized bed, as well as the type of insulating material used. The coils, of course, must not be permitted to reach the temperature at which the generated heat will injure the temperature sensitive enameled wire itself or other temperature sensitive parts.

The illustrated means (FIG. 1) for energizing and deenergizing the coils 17 of winding 15 during this insulating step includes a normally open switch 41 mounted to the outer surface of tank 30. The switch has an actuator arm 42 projecting inwardly of the tank into the descending path of stator 10a, the normal position of arm 42 being represented by the broken lines in FIG. 1. As the stator 10a is lowered into tank 30, the stator engages arm 42 and moves it to the lower operated position (as viewed in the drawing), closing the switch contacts (not shown) to close the winding circuit. The coils are energized from power line 38, through conductor 43, current or voltage varying means, such as rheostat 44, conductor 45, switch 41, conductor 46, winding leads 34 and 35, through conductor 47, timing means such as timer 48, returning to supply line 39 through conductor 49. The energized timer starts operation for a pre-selected period of time as soon as switch 41 is closed. After the proper period of time has expired, the timer closes the motor circuit (by any well known means) through conductors 50 and 51, to actuate the motor and winch assembly 28, whereupon the stator with its insulated winding 15 is lifted out of tank 30 by the action of the winch.

As the stator is raised, it contacts switch arm 42 and moves it from the operated to the normal position (broken lines) opening the switch contacts, which in turn, causes winding coils 17 to be deenergized. Since the circuit through conductors 49, 50 and 51 is still closed, the motor and winch assembly will be operated until the stator and support 25 have been returned to the raised position. At this time, the motor circuit may be opened by timer 48 and the motor and timer will cease operation. The quick-connect clips 36 and 37 are then dis-engaged respectively from external winding leads 34 and 35 and are ready to be attached to the leads of the stator 10a seen in position "A."

Once the insulating step outlined above has been completed and the insulation has been cured (by any suitable way; e.g. at room temperature) into a hard substantially uniform covering 40 (see stator 10b FIG. 3), a main winding 52 may be wound beside and axially beyond the insulated auxiliary winding 15, in close proximity thereto behind winding pins 21. Like the auxiliary winding, main winding 52 will thus have a coil 53 provided around each pole 12. The stator at this point of assembly, is ready to have the wires composing the main winding, bonded together to retain them in a stationary mass.

This bonding step may be accomplished in the following way. The stator, having main winding 52 positioned thereon, may be hung onto a conveyor 54, shown in FIG. 4, by means of hanger 55. The stator is then completely immersed or dipped into a suitable bonding material 56, such as a phenolic type varnish, carried by container 57. Immediately after the wet stator travels out of this container, the varnish is removed from the rotor bore 14, as for example by wiping the bore with a rag (not shown), to clear the bore of varnish which might otherwise adversely affect motor performance.

The final step to be performed is the hardening of the varnish by any suitable means, such as by the application of a controlled amount of heat provided by kiln 58 with its controlling heating means 59, as shown in the right side (as viewed in the drawing) of FIG. 4. After the stator has been subjected to heat in the oven for a sufficient time necessary to harden the bonding material, it is then removed from hanger 55 and allowed to cool, resulting in the construction shown in FIG. 5.

It will be observed from FIG. 5 that insulation 40, disposed between the auxiliary coils 17 and main winding 52, effectively insulates (electrically) the adjacent portions of the respective winding coils. In addition, neither the electrical insulation 40 nor the bonding material 60 will materially impede the flow of heat from the stator core and main winding 52 when stator 10 is used in those situations which require the effective dissipation of heat during motor operation.

Although our invention has been shown as employing winding pins 21 permanently secured to the stator, it should be recognized by those skilled in the art that the present invention could equally as well use some form of winding pin only during the formation of the stator. The pins could be removed after the hardening of bonding material 56 for re-use, for insulation 40 is capable of retaining the auxiliary winding 15 away from the stator bore 14 while the bonding material 56 performs the same function for the main winding 52. Further, each material holds the individual wires of the respective windings in a fixed position relative to one another.

The following example is given in order to illustrate more clearly how the invention, as described above, has been carried forth in actual practice. A two-pole stator core for a 115 volt motor, the core having an outer diameter of 3.185 inches and a rotor receiving bore of 1.702 inches, was provided with an auxiliary winding, the coils of which were composed of 40 turns of enameled magnet wire 0.0253 inch in diameter. The winding was connected to an electric current source and approximately 19 volts of direct current applied to the winding while the stator was immersed in the fluidized bed. Powdered epoxy resin known as G.E. #57–148–102 having a melting point of about 105° centigrade was used as the insulating material. The coils were heated while in the fluidized bed for approximately 17 seconds. The stator was then removed from the bed and the electric current shut off. After the insulation was substantially cured, a main winding having coils consisting of 80 turns of 0.0302 inch enameled magnet wire was wound directly onto the poles of the stator. This assembly was covered with epoxy-based varnish, identified in the trade as XC–306, manufactured by Hanna, in accordance with the bonding step set forth heretofore. It was found that the insulation provided between the windings and the enameled insulation of the main and auxiliary winding wire, together were capable of successfully withstanding 4,700 volts of alternating current, as measured between one side of the auxiliary winding and the adjacent side of the main winding in the standard and well known "ground between" type of test. This is well above the 1,480 volt U.L. requirement for a motor of this kind.

The advantages of the present invention are readily manifest from the foregoing. The stator construction has incorporated therein an excellent electrical insulation between adjacent coils of the respective windings while at the same time the insulation does not interfere with the dissipation of heat from the main winding. In addition, the individual wires of the windings are effectively kept from moving relative to each other as well as retained away from the rotating parts of the motor. Further, the number and cost of the individual manufacturing operations have been reduced.

The novel process of the invention insures that the insulation is disposed on the stator coils only, without necessitating the masking or the like of the stator parts not desired to be coated. Another advantage of the novel process is the accurate control of uniformity and total thickness of the resulting layer of insulation applied to the winding. This is possible due to the fact that the heat or energy supplied to the winding can be accurately regulated while the winding is immersed in the fluidized bed, both by the controlled time of immersion (e.g. timer 48) and the controlled addition of heat (e.g. rheostat 44).

It should be apparent to those skilled in the art, that while we have shown and described what at present is considered to be the preferred embodiment of our invention in accordance with the patent statutes, changes may be made in the structure disclosed without actually departing from the true spirit and scope of this invention, and we therefore intend to cover in the following claims all such equivalent variations as fall within the invention.

What we claim as new and desire to secure by Letters Patent of the United States is:

1. A stator for use in a dynamoelectric machine comprising a core having a bore and winding accommodating means disposed adjacent said bore, main and auxiliary windings carried by said means, said main and auxiliary windings having portions thereof disposed adjacent one another, said auxiliary winding having a coating of very thin electrical insulating material fused in situ thereon for electrically insulting said auxiliary winding from the said main winding, and means adhering to and enveloping said windings for bonding said windings together as a unit.

2. A stator for use in a dynamoelectric machine comprising a core having a bore and winding accommodating means disposed adjacent said bore, main and auxiliary windings each formed of a number of turns of wire arranged in said means in close proximity with one another, each winding having end turns extending axially beyond each side face of said core, a very thin coating of electrical insulating material fused in situ on the portion of said auxiliary winding disposed adjacent said main winding for electrically insulating said windings from each other and for holding the wires of said auxiliary winding stationary, and a coating of bonding material covering the outer surface of said main winding for retaining the end turns of said main winding stationary and further covering the auxiliary winding and bonding the windings together as a unit.

References Cited by the Examiner

UNITED STATES PATENTS

| | | | |
|---|---|---|---|
| 2,354,551 | 7/1944 | Sawyer | 29—155.5 |
| 2,629,061 | 2/1953 | Swarthout. | |
| 2,683,231 | 7/1954 | MacFarlane et al. | 310—184 |
| 2,804,589 | 8/1957 | Penn | 310—184 X |
| 2,807,736 | 9/1957 | Jensen | 310—184 |
| 2,814,096 | 11/1957 | Herbrecht | 29—155.5 |
| 2,900,588 | 8/1959 | Ramer | 310—172 |
| 3,002,119 | 9/1961 | Lindstrom | 310—260 |
| 3,014,145 | 12/1961 | Lindstrom | 310—198 |

FOREIGN PATENTS

| | | |
|---|---|---|
| 1,066,200 | 6/1954 | France. |
| 782,040 | 8/1957 | Great Britain. |

ORIS L. RADER, *Primary Examiner.*

MILTON O. HIRSHFIELD, *Examiner.*

UNITED STATES PATENT OFFICE
CERTIFICATE OF CORRECTION

Patent No. 3,244,918                                            April 5, 1966

Charles V. Pennell et al.

It is hereby certified that error appears in the above numbered patent requiring correction and that the said Letters Patent should read as corrected below.

In the grant, lines 2 and 3, and line 12, and in the heading to the printed specification, lines 5 and 6, for "Polymer Processes, Inc.", each occurrence, read -- The Polymer Corporation --.

Signed and sealed this 6th day of December 1966.

(SEAL)
Attest:

ERNEST W. SWIDER                            EDWARD J. BRENNER

Attesting Officer                                   Commissioner of Patents